United States Patent
Tajima et al.

(10) Patent No.: US 6,309,110 B1
(45) Date of Patent: Oct. 30, 2001

(54) WHEEL BEARING ASSEMBLY WITH BRAKE ROTOR

(75) Inventors: Eiji Tajima; Hisashi Ohtsuki; Akira Torii, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/450,730

(22) Filed: Nov. 30, 1999

(30) Foreign Application Priority Data

Dec. 2, 1998 (JP) .................................................. 10-343166
Aug. 10, 1999 (JP) .................................................. 11-226519

(51) Int. Cl.[7] ........................... F16C 19/02; B60B 27/00; B60T 1/06
(52) U.S. Cl. ...................... 384/544; 384/589; 188/18 A; 301/105.1; 301/6.1
(58) Field of Search ..................................... 384/544, 589; 301/6.1, 105.1; 29/898.04; 451/63, 902; 188/18 A

(56) References Cited

U.S. PATENT DOCUMENTS

| | | | |
|---|---|---|---|
| 3,665,657 | 5/1972 | Lill | 51/236 |
| 3,757,883 | * 9/1973 | Asberg | 384/544 X |
| 4,232,763 | * 11/1980 | Klaue | 188/18 A |
| 4,778,286 | 10/1988 | Kadokawa | 384/446 |
| 5,152,104 | * 10/1992 | Wood et al. | 51/118 |
| 5,430,926 | * 7/1995 | Hartford | 29/434 |
| 5,901,818 | * 5/1999 | Martino | 188/218 XL |
| 5,915,502 | * 6/1999 | Rapisardi et al. | 188/18 R |
| 5,975,767 | * 11/1999 | Mizukoshi et al. | 384/544 |
| 6,126,322 | * 10/2000 | Otsuki et al. | 384/544 |

* cited by examiner

Primary Examiner—Thomas R. Hannon
(74) Attorney, Agent, or Firm—Wenderoth, Lind & Ponack, L.L.P.

(57) ABSTRACT

To prevent vibrations and uneven wear of a brake resulting from runout of the brake rotor, a reliable wheel bearing assembly with a brake rotor is proposed which needs no troublesome runout adjustment at a car assembling factory. The assembly includes an outer member having two raceways on its inner circumferential surface, an inner member having raceways each provided opposite a respective one of the two raceways, and rolling elements arranged in two rows between the outer and inner members. One of the outer and inner members is provided with a wheel mounting flange, and the brake rotor is mounted to the wheel mounting flange. The runout variation of a side of the brake rotor is maintained within a standard value with a fixed-side member as a datum.

16 Claims, 12 Drawing Sheets

WHEEL BEARING ASSEMBLY WITH BRAKE ROTOR

BACKGROUND OF THE INVENTION

This invention relates to an automotive wheel bearing assembly with a brake rotor.

Among automotive wheel bearing assemblies, there are ones for driving wheels and ones for non-driving wheels. As an example, a wheel bearing assembly for a driving wheel is shown in FIG. 12. It comprises an outer member 3 having two raceways 3a, 3b on its inner circumferential surface, an inner member 1 having raceways 1a, 1b opposite the raceways 3a, 3b, and rolling elements 8 disposed between the outer member 3 and the inner member 1 in two rows. The inner member 1 has a wheel-mounting flange 2. Also, in this example, the inner member 1 has a hole 9 for receiving a drive shaft in its inner circumferential surface. Of two raceways 1a, 1b on the inner member 1, the outer raceway 1a is formed directly on the outer circumferential surface of the inner member 1, while the inner raceway 1b is formed on a separate inner ring.

When wheel bearing assemblies are delivered to an assembling factory of a car manufacturer from a wheel bearing manufacturer, a brake rotor 20, which has been delivered as a separate part, is fixed by bolts 18 to the side 2a of the wheel-mounting flange 2 at the car assembling factory. But if after assembling there is a runout on the side 21 of the brake rotor 20, with the increasing speed of cars, brake judder may occur during braking from high speeds, or brakes may be worn unevenly. With a certain state of runout, brake vibrations may occur even at low speeds.

Heretofore, in order to prevent such runout of the side 21 of the brake rotor 20, when the brake rotor (which has been delivered as a separate part) is mounted to the wheel mounting flange 2 of a wheel bearing assembly delivered from a wheel bearing manufacturer at a car assembling factory, adjustment of phase between the runout of the wheel mounting flange 2 and the runout of the side 21 of the brake rotor 20 was necessary. Such a method is rather troublesome and poor in workability.

Also, at a car assembling factory, due to aesthetic reasons, rust-preventive coating is usually applied to the surface of the brake rotor. If a coating is applied to the brake rotor, runout tends to grow due to uneven thickness of the coating.

An object of this invention is to prevent vibrations and uneven wear of a brake resulting from runout of the brake rotor caused by an increase in the car speed, and to provide a reliable wheel bearing assembly with a brake rotor which needs no troublesome runout adjustment at a car assembling factory.

SUMMARY OF THE INVENTION

According to this invention, there is provided a wheel bearing assembly with a brake rotor comprising an outer member having two raceways on inner circumferential surface thereof, an inner member having two raceways each provided opposite the two raceways on the outer member, and rolling elements arranged in two rows between the outer member and the inner member. One of the outer member and the inner member is provided with a wheel mounting flange, and the brake rotor is mounted to the wheel mounting flange. The runout variation of a side of the brake rotor is restricted within a predetermined value when measured while rotating the one member with the other of the outer member and the inner member as a reference.

Such a wheel bearing assembly is highly reliable and can be assembled at a car assembling factory. This eliminates the runout problem, and adjustment of runout at the assembling factory is not necessary any more. Restricting the runout to 50 $\mu$m or under brings good results. 30 $\mu$m or under is more preferable.

Forming raceways directly on the outer member and the inner member is advantageous because the number of parts required is less.

The present invention is applicable to both wheel bearing assemblies for a driving wheel and those for a non-driving wheel.

The restriction of runout is carried out before assembling the wheel bearing assembly. A brake rotor is mounted on one of the inner member or the outer member formed with a wheel mounting flange, and the one of these two is rotated while using the other as a datum.

Other features and objects of the present invention will become apparent from the following description made with reference to the accompanying drawings, in which:

DETAILED DESCRIPTION OF THE PREFERRED EMBODIMENT

Figure 1:
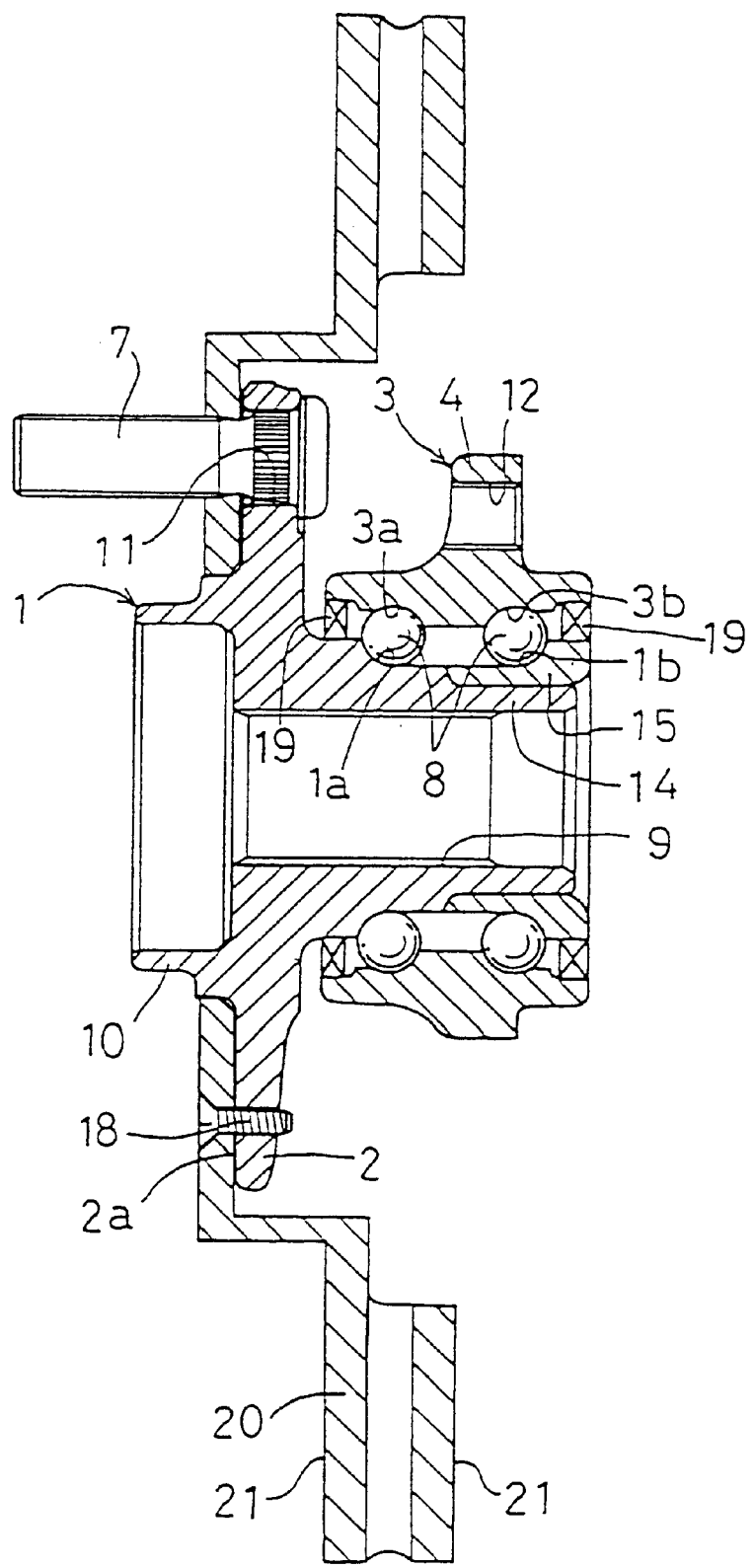
FIG. 1 is a sectional view of a first embodiment of a wheel bearing assembly with a brake rotor according to this invention.
Figure 7:
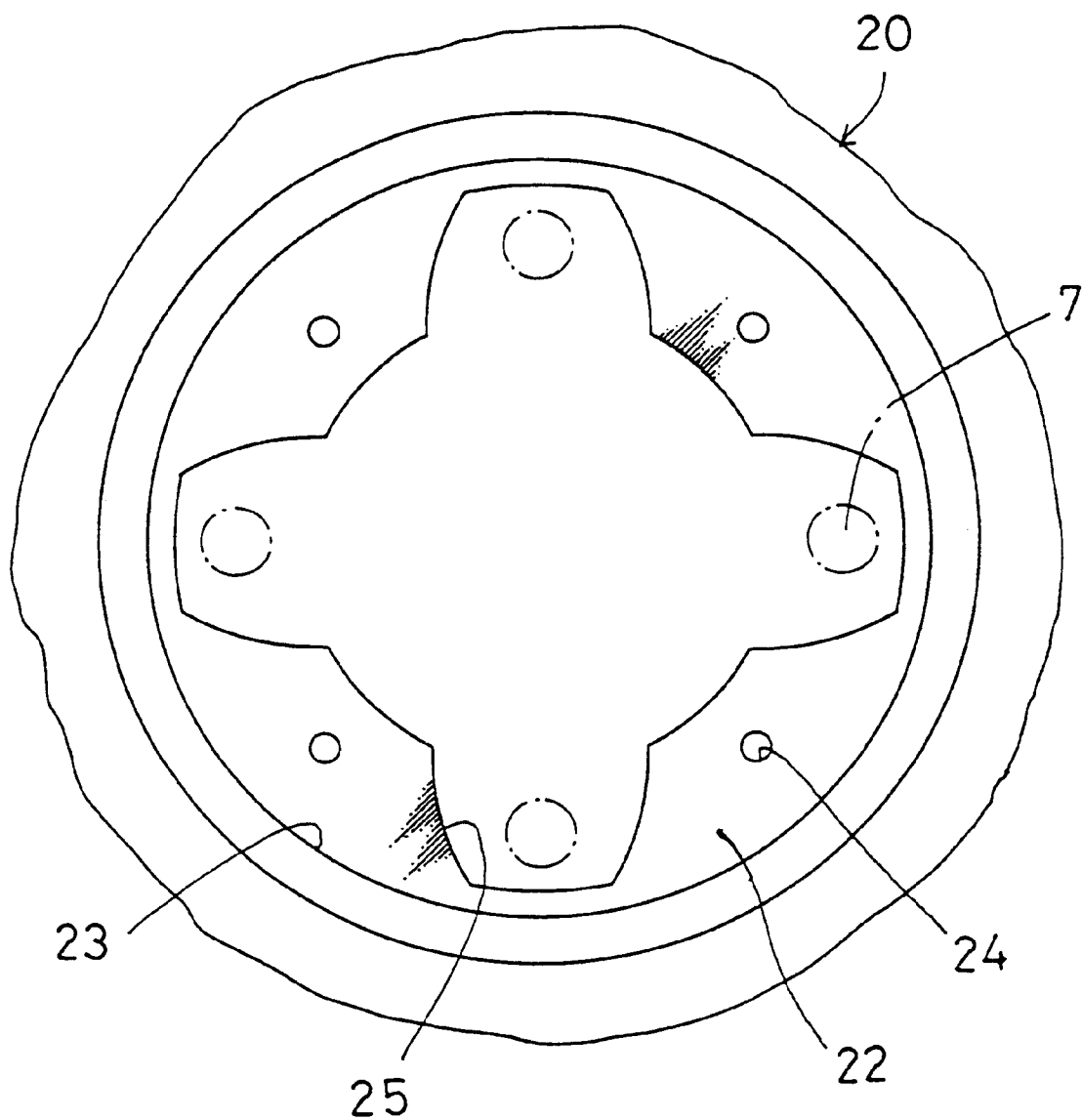
FIG. 7 is a front view of a portion of a brake rotor of the sixth embodiment.
Figure 8:
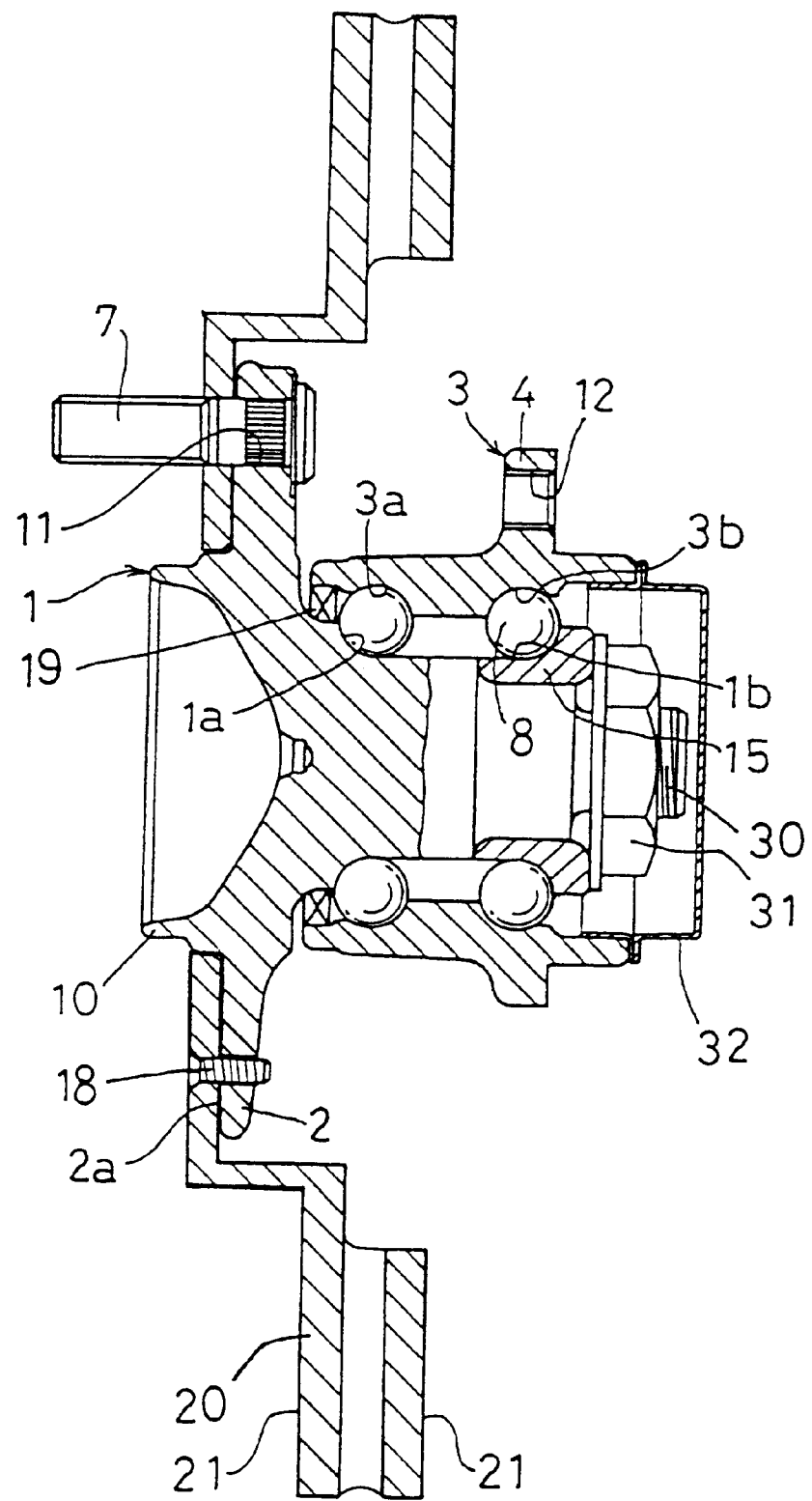
FIG. 8 is a sectional view of a seventh embodiment.
Figure 9:
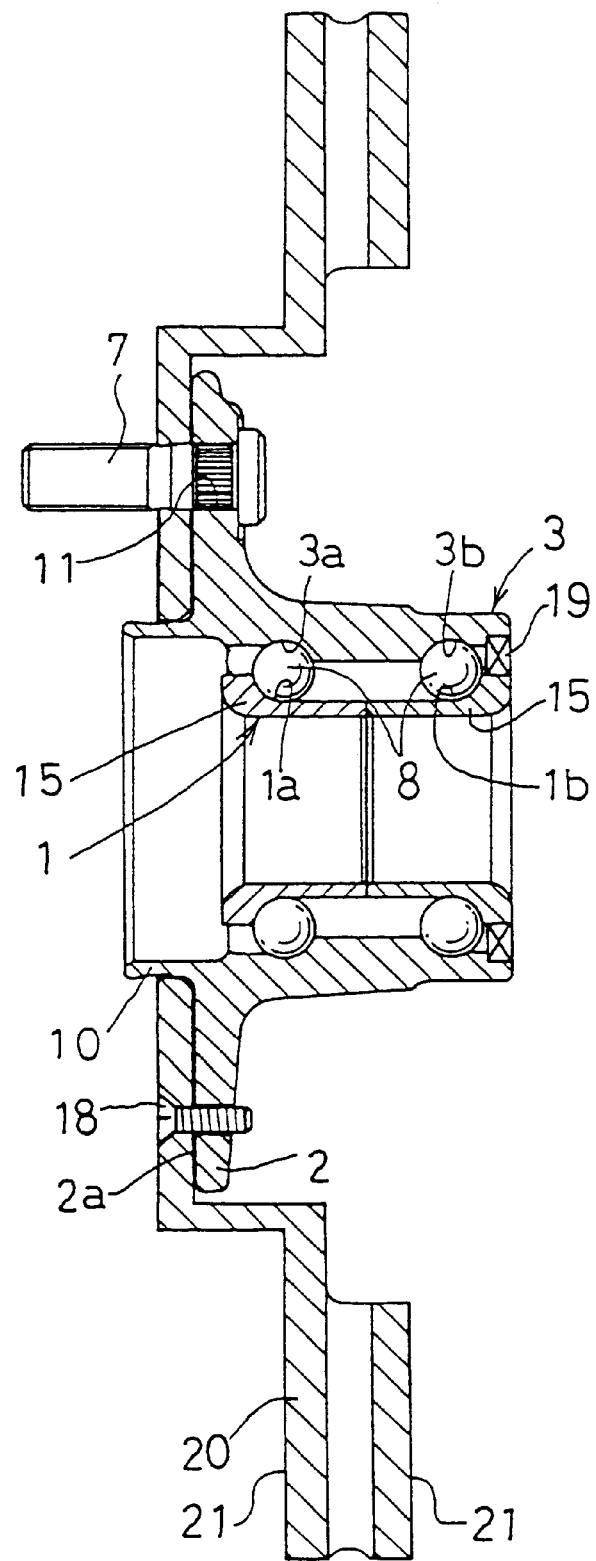
FIG. 9 is a sectional view of an eighth embodiment.
Figure 10:
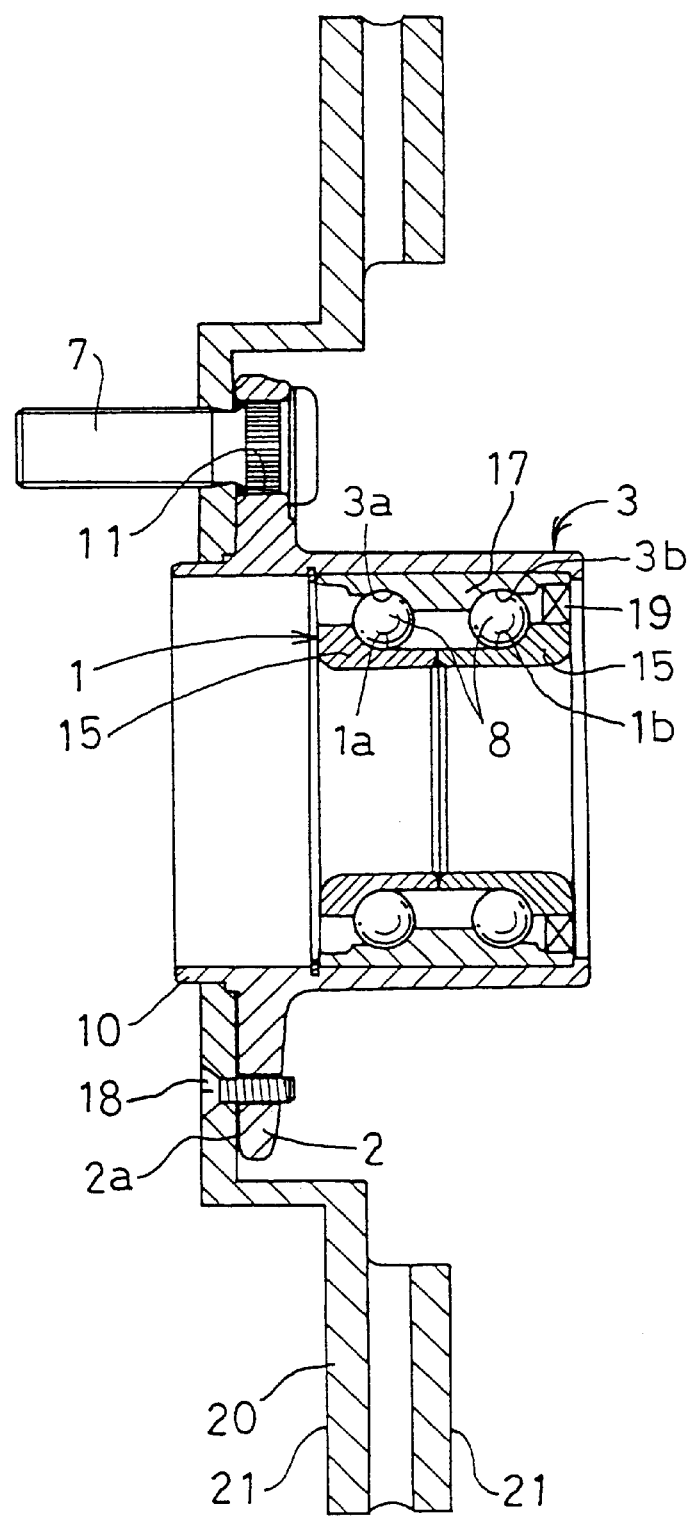
FIG. 10 is a sectional view of a ninth embodiment.
Figure 11:
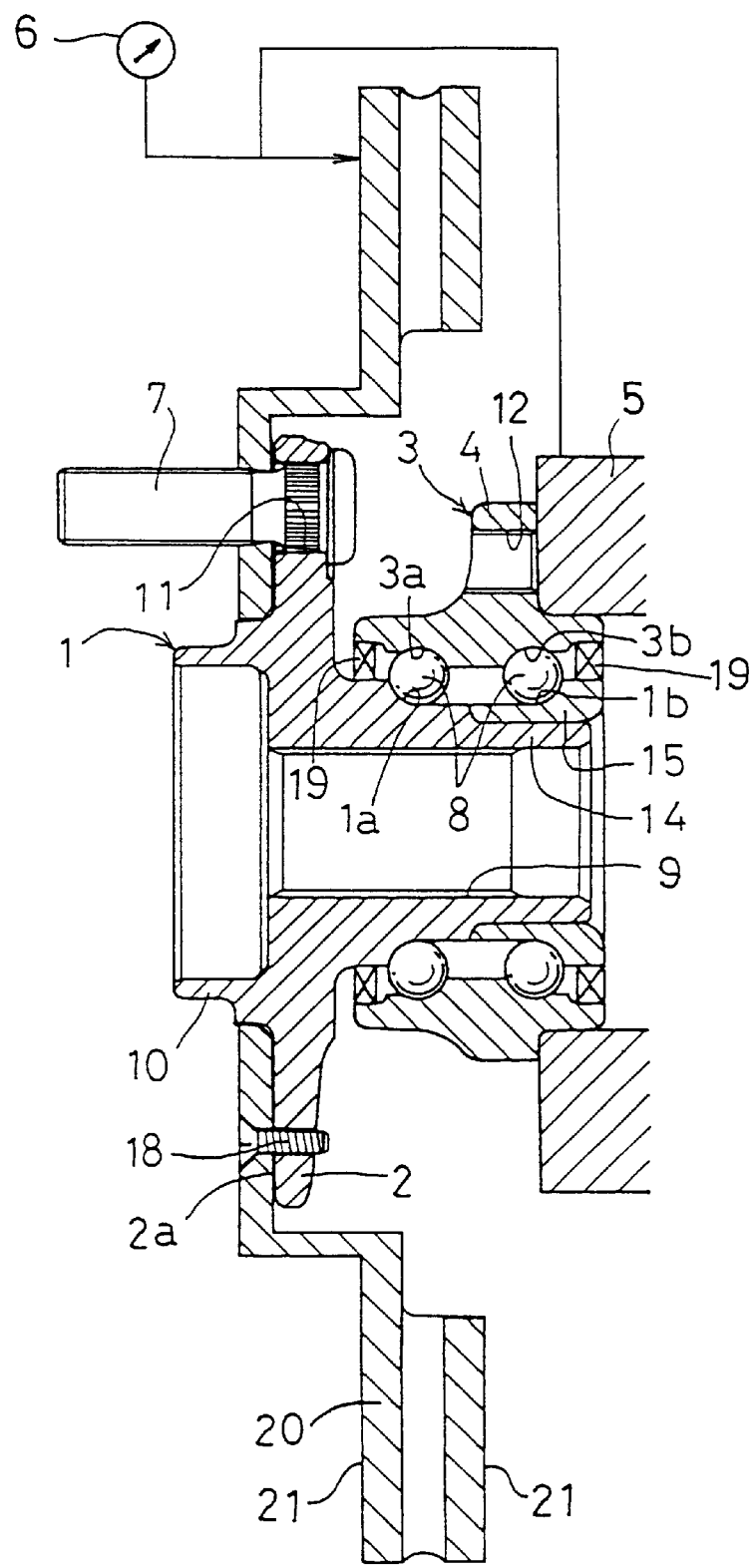
FIG. 11 is a schematic view showing an example of method for measuring the runout variation of a side of a brake rotor.
Figure 12:
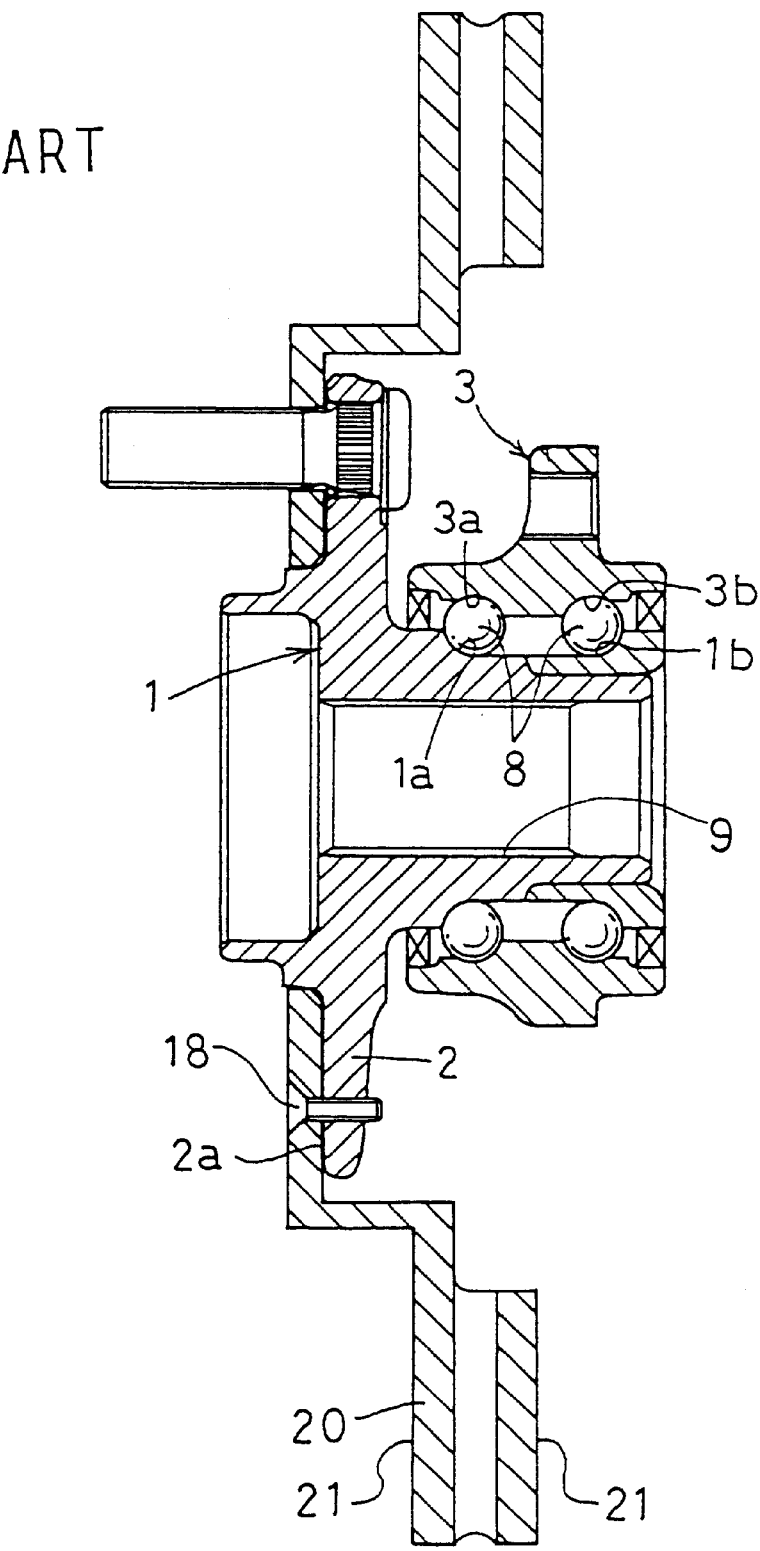
FIG. 12 is a sectional view of the prior art.

An automotive wheel bearing assembly comprises, as shown in FIG. 1, an outer member 3 having two raceways 3a, 3b on its inner circumferential surface, an inner member 1 having raceways 1a, 1b opposite the raceways 3a, 3b, and rolling elements 8 disposed between the outer member 3 and the inner member 1 in two rows. The inner member 1 has a wheel-mounting flange 2. A brake rotor 20 is fastened to the side 2a of the wheel mounting flange 2 by bolts 18. Specifically, there are assemblies for a driving wheel, in which the drive shaft of a constant velocity joint is mounted, as shown in FIGS. 1 through 7, and assemblies for a non-driving wheel, in which no drive shaft is mounted, as shown in FIGS. 8 through 10.

The brake rotor-carrying wheel bearing assembly shown in FIG. 1 is a wheel bearing assembly for a driving wheel, and constitutes a first embodiment of this invention. The inner member 1 is formed with a hole 9 having splines on its inner circumferential surface adapted to engage a drive shaft. Of the two raceways 1a, 1b of the inner member 1, the outer raceway 1a (with respect to the outer side of the vehicle) is formed directly on the outer circumferential surface of the inner member, while the inner raceway 1b (with respect to the inner side, i.e., central axis, of the vehicle) is formed on a separate inner ring 15 which is fitted on a shoulder at one end of a hub wheel 14.

The hub wheel 14 of the inner member 1 of FIG. 1 is integrally formed with a wheel mounting flange 2 having an outer side on which is formed a wheel pilot 10 at its center. The wheel mounting flange 2 is formed with bolt holes 11 for wheel-fixing hub bolts 7. The brake rotor 20 is adapted to be fixed to an outer mounting surface 2a by bolts 18. The two raceways 3a, 3b are formed directly on the inner circumferential surface of the outer member 3. Further, the outer member 3 has an integral flange 4 having a bolt hole 12 and is adapted to be fixed to the car body. Seal members 19 for sealing the interior of the bearing are pressed into the member 3 at both ends. In this embodiment of FIG. 1, the surface runout of the outer surface 21 of the brake rotor 20 is restricted (i.e., maintained) within a standard value, which is preferably 50 $\mu$m or less, more preferably 30 $\mu$m or less.

Figure 2:
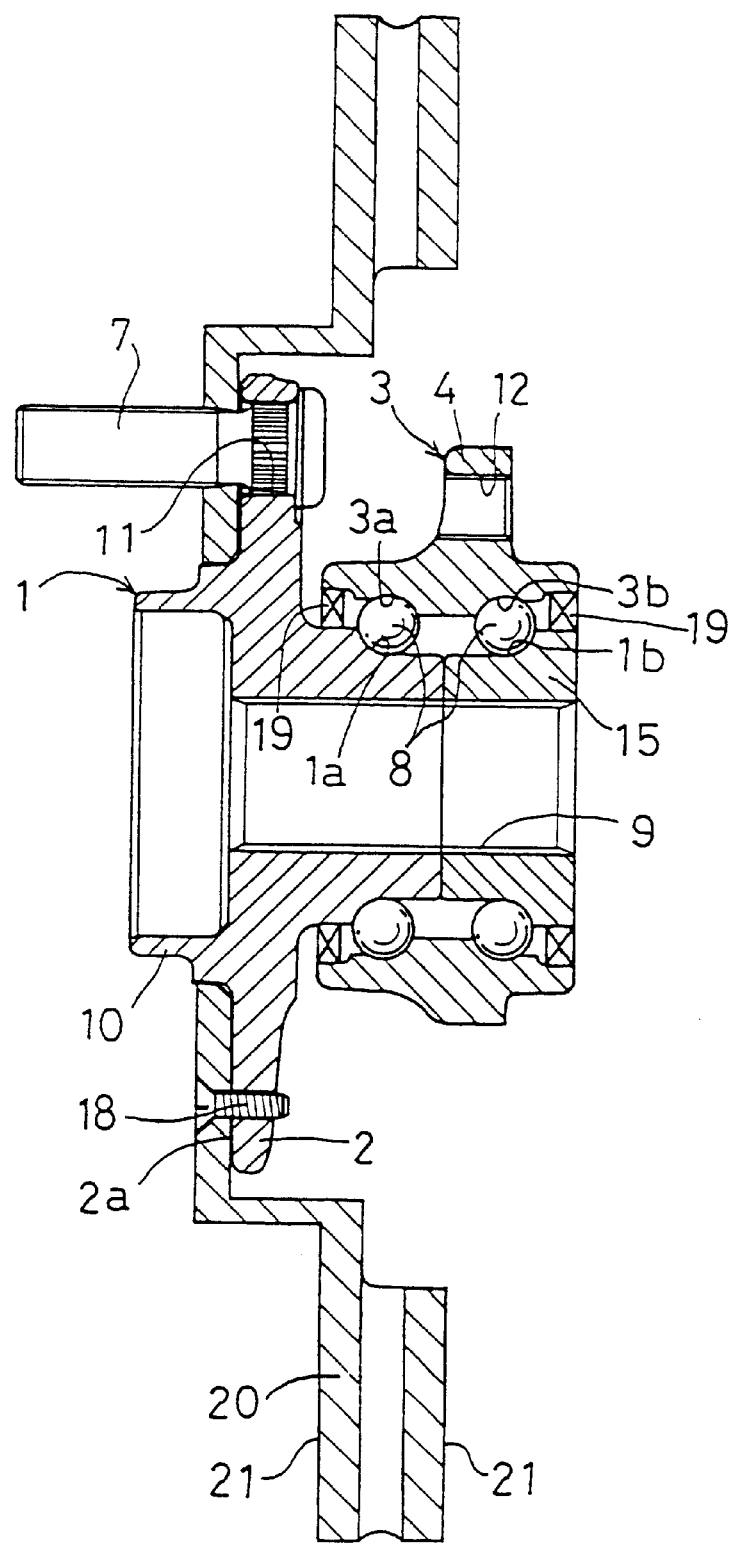
FIG. 2 is a sectional view of a second embodiment.

The wheel bearing assembly with a brake rotor shown in FIG. 2 is a wheel bearing assembly for a driving wheel and constitutes a second embodiment of this invention. The separate inner ring 15 in the first embodiment is structured to be pressed onto the wheel axle of a constant velocity joint.

Figure 3:
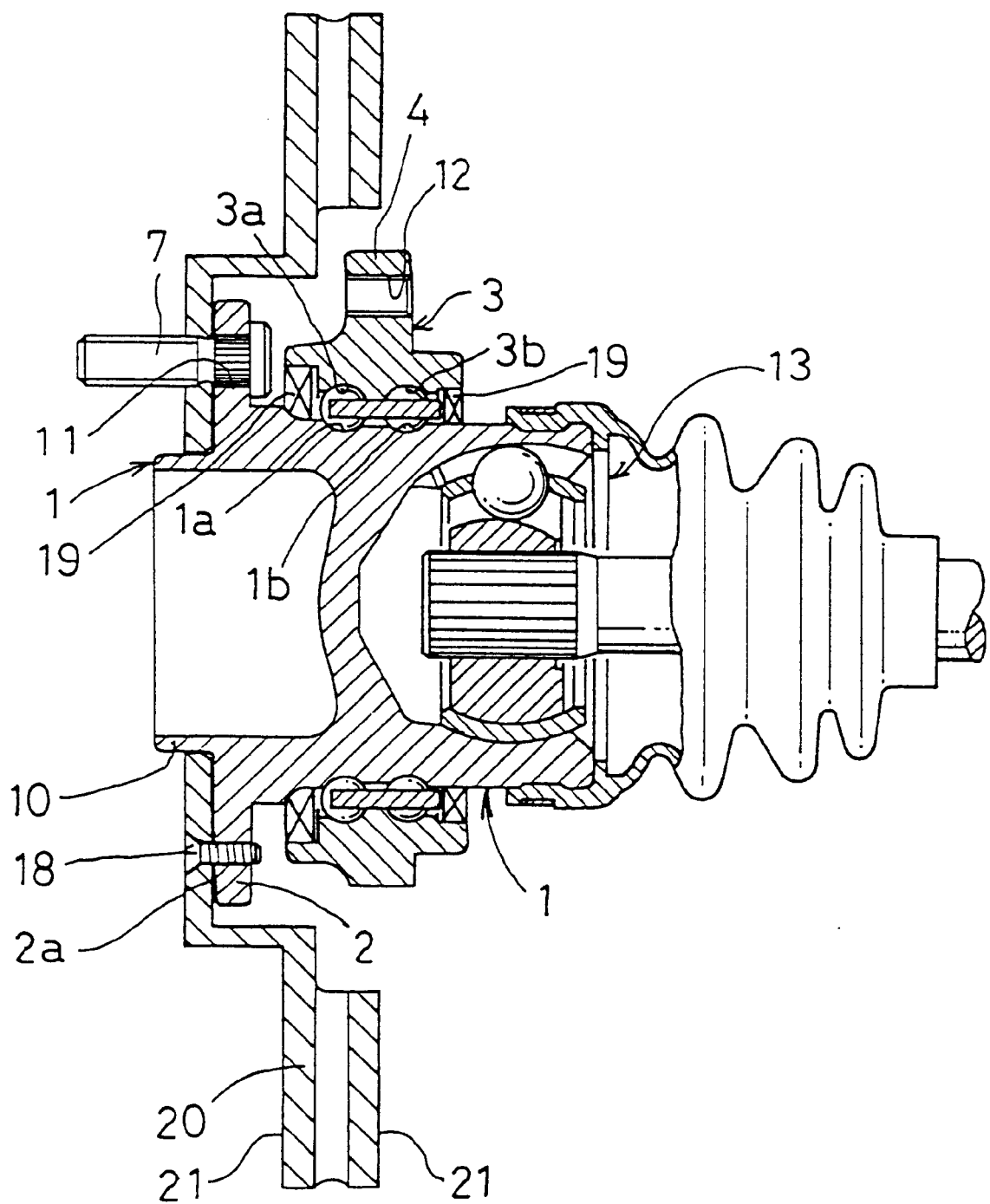
FIG. 3 is a sectional view of a third embodiment.

The wheel bearing assembly with a brake rotor shown in FIG. 3 is a wheel bearing assembly for a driving wheel, and is a third embodiment of this invention. In this example, the inner member 1 is integral with an outer ring of a constant velocity joint. Two raceways 1a, 1b are formed directly on the outer circumferential surface of the inner member 1. Also, a wheel pilot 10 and a wheel mounting flange 2 are integrally formed on the outer side of the inner member 1. On the other hand, two raceways 3a, 3b are directly formed on the inner circumferential surface of the outer member 3. Also, the outer member has on its outer surface a knuckle-mounting flange, i.e., a flange 4 having bolt holes 12 and adapted to be fixed to the car body.

In the embodiment of FIG. 3, a brake rotor 20 is fixed to the outer mounting surface 2a of the flange 2 by bolts 18. The runout of the outer surface 21 of the brake rotor 20 is maintained within a standard value which is preferably 50 $\mu$m or under as in the first embodiment. For the subsequent embodiments too, the runout of the outer surface 21 of the brake rotor 20 is maintained within a standard value, which is, as in the first and second embodiments, desirably 50 $\mu$m or under, and more preferably 30 $\mu$m or under.

Figure 4:
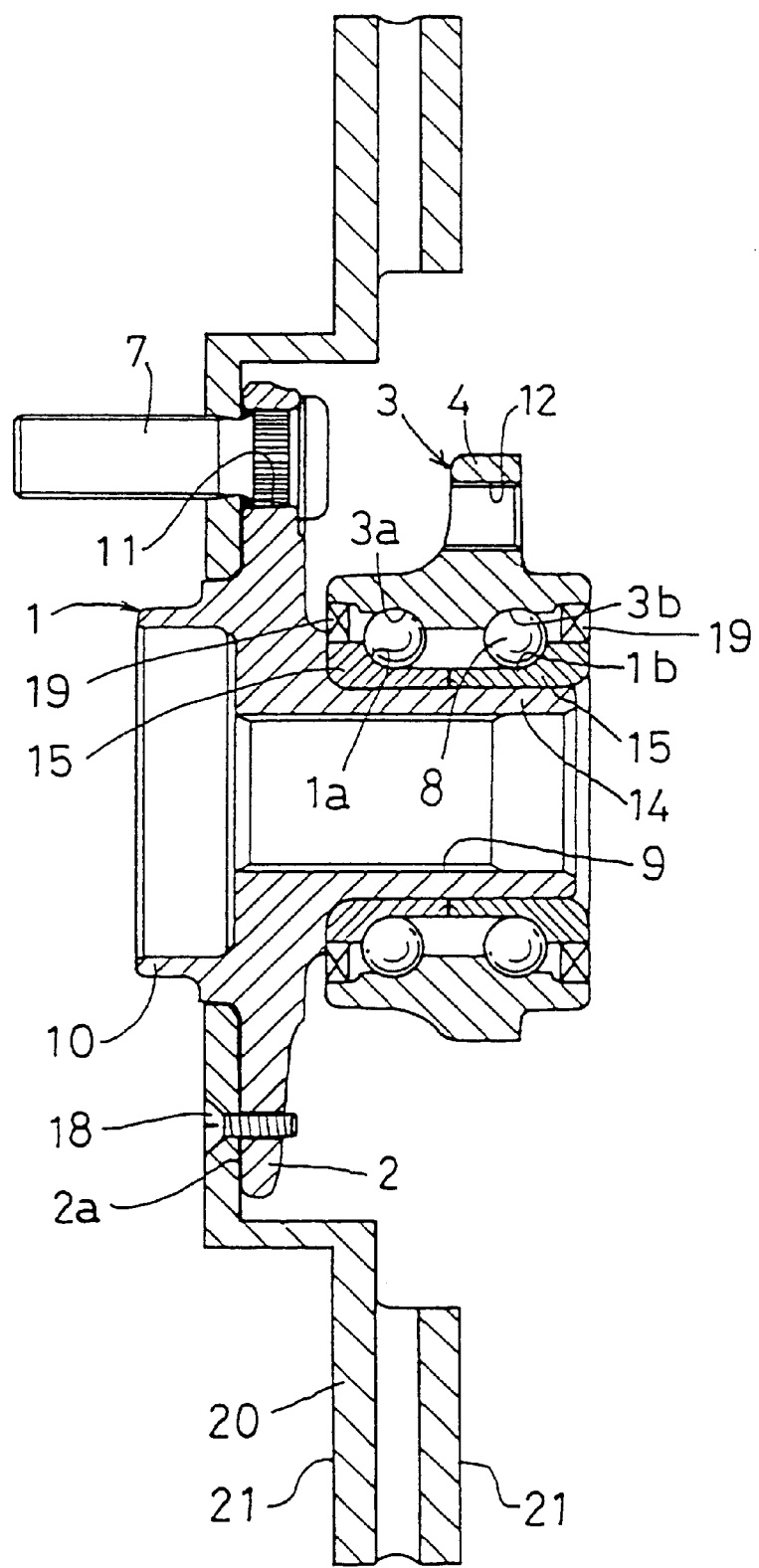
FIG. 4 is a sectional view of a fourth embodiment.

The wheel bearing assembly with a brake rotor shown in FIG. 4 is also a wheel bearing assembly for a traction wheel and is a fourth embodiment of this invention. The two raceways 1a, 1b of the inner member 1 are formed on two separate inner rings 15. The inner member 1 has a wheel mounting flange 2 having an outer mounting surface 2a to which is fixed a brake rotor 20 by bolts 18. Like the wheel bearing assemblies shown in FIGS. 1 through 3, the outer member 3 is one having two raceways 3a, 3b formed on its inner circumferential surface.

Figure 5:
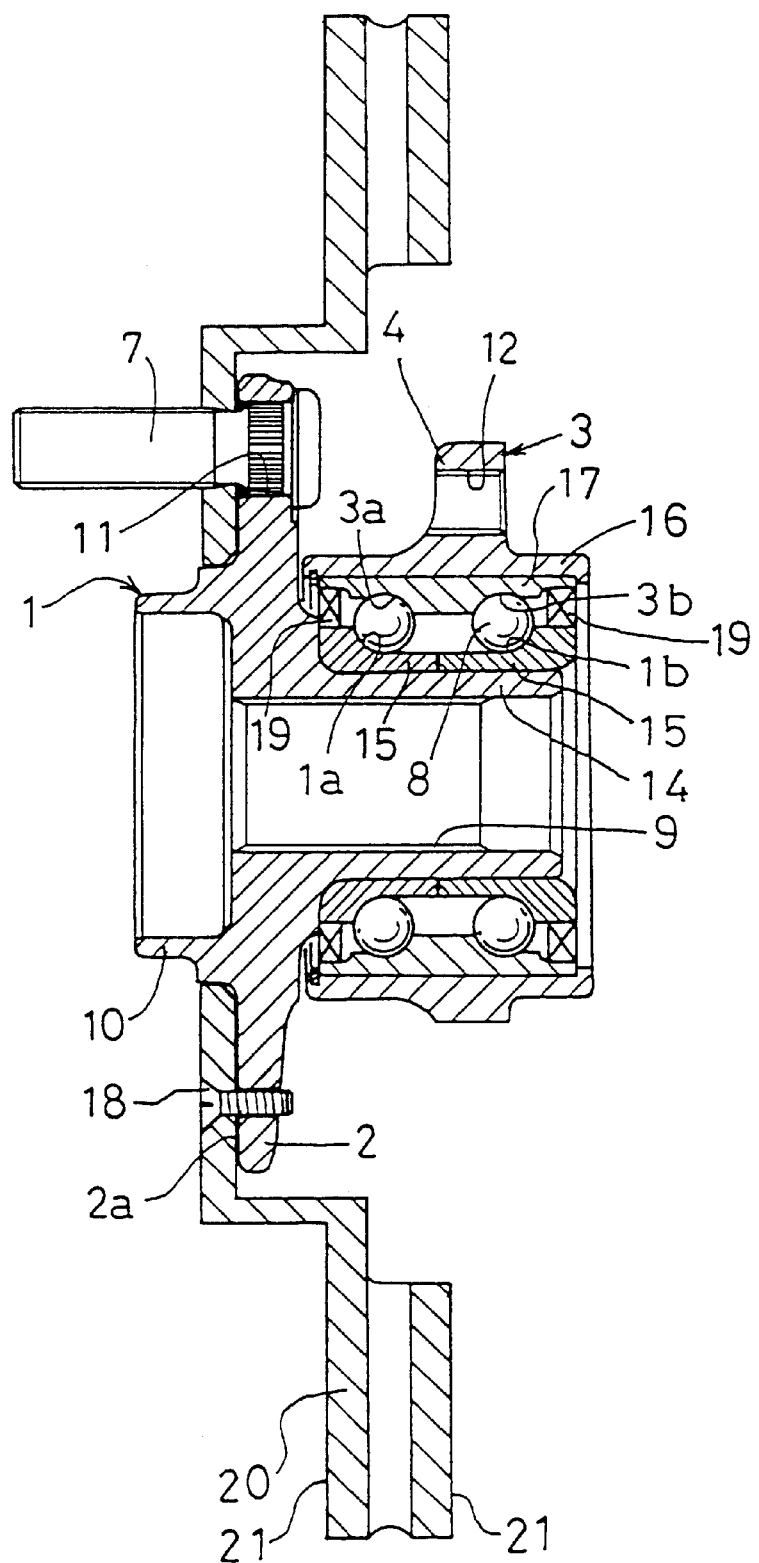
FIG. 5 is a sectional view of a fifth embodiment.

The wheel bearing assembly with a brake rotor shown in FIG. 5 is also a wheel bearing assembly for a driving wheel, and is a fifth embodiment of this invention. Like the one shown in FIG. 4, the inner member 1 shown in FIG. 5, which is mounted on the drive shaft, has its two raceways 1a, 1b formed on two separate inner rings 15. Also, the outer member 3 comprises a housing 16 formed with a flange 4 having bolt holes 12 and adapted to be fixed to the car body, and an outer ring 17 formed with two raceways 3a, 3b.

Figure 6:
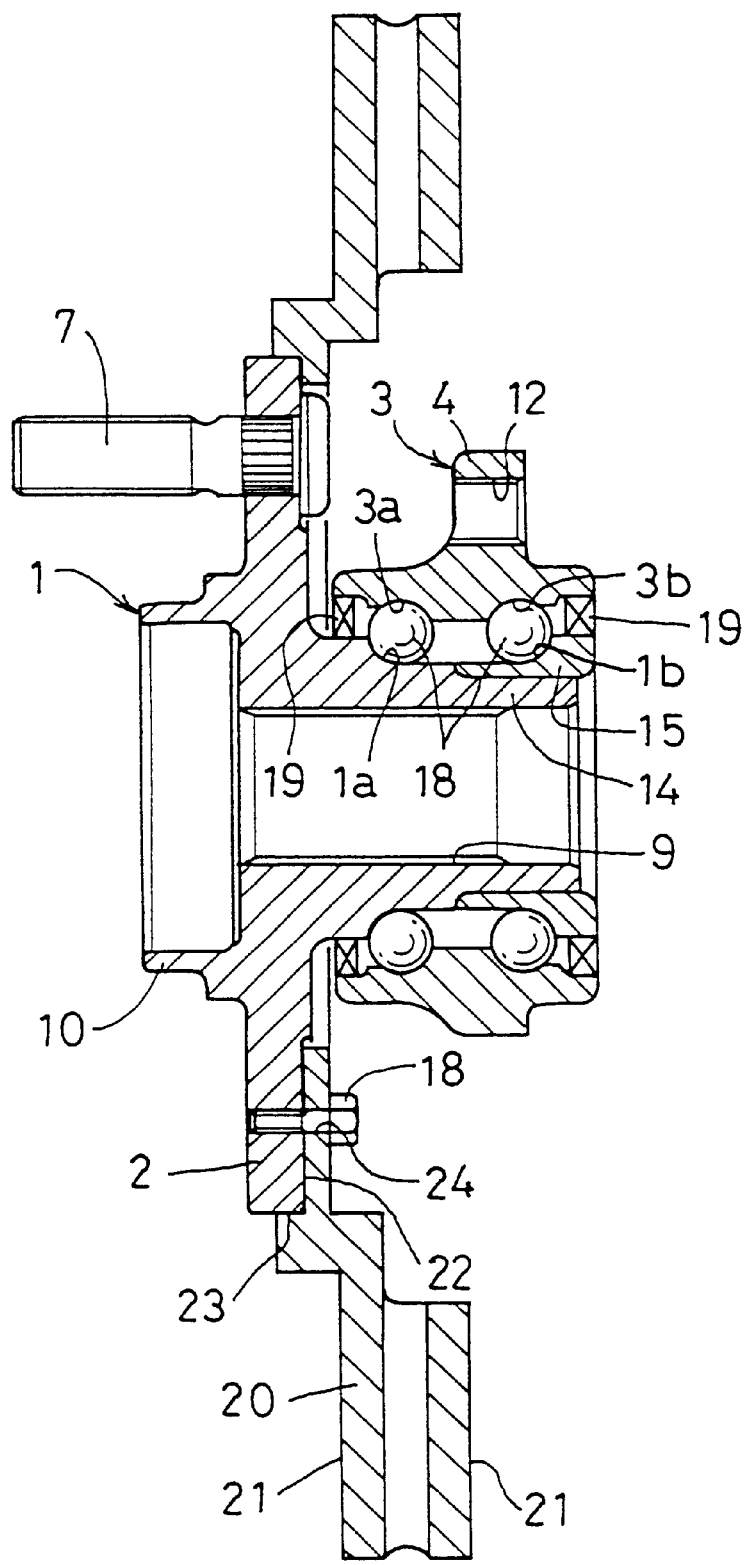
FIG. 6 is a sectional view of a sixth embodiment.

Next, the wheel bearing assembly with a brake rotor shown in FIG. 6 is a wheel bearing assembly for a driving wheel, and is a sixth embodiment of this invention. In this embodiment, a brake rotor 20 is fixed to the inner side (an inner mounting surface) of the wheel mounting flange 2.

As in this sixth embodiment, the brake rotor 20 can be mounted to the inner side of the wheel mounting flange 2. Therefore, because the inner side surface of the wheel mounting flange 2 is not a wheel mounting surface, the mounting surface 22 of the brake rotor 20 is, as shown in FIG. 7, formed in a shape having a step 23 so that the outer circumferential surface of the wheel mounting flange 2 of the inner member 1 serves as a brake pilot.

In the mounting surface 22 of the brake rotor 20, only holes 24 for bolts 18 for fixing the brake rotor 20 are formed, and cutouts 25 are formed to prevent the hub bolts 7 from interfering with the mounting surface 22. By forming the cutouts 25 in the mounting surface 22 of the brake rotor 20, when nuts are tightened onto the hub bolts 7, even if the wheel is deformed axially, the brake rotor 20 will not be affected at all. Thus it is possible to further reduce the runout of the brake rotor 20.

As in the sixth embodiment, mounting the brake rotor 20 to the inner side of the wheel mounting flange is applicable to the other embodiments too.

Next, the wheel bearing assembly with a brake rotor shown in FIG. 8 is a wheel bearing assembly for a non-driving wheel, and is a seventh embodiment of this invention. Of the two raceways 1a, 1b of the inner member 1, the outer raceway 1a is formed directly on its outer surface, while the, inner raceway 1b is formed on a separate inner ring 15 mounted on its inner end. The inner member 1 is integrally formed with a wheel mounting flange 2. To the outer mounting surface 2a of the wheel mounting flange 2, a brake rotor 20 is fixed by bolts 18. Also, the outer member 3 has two raceways 3a, 3b formed directly on its inner circumferential surface, and has on the outer circumferential surface a flange 4 having bolt holes 12 for fixing to the car body. A threaded portion 30 is formed on the inner side of the inner member 1. By tightening with a nut 31, the inner ring 15 is fixed to give the bearing a preload and a bearing rigidity. Further, the inner side is sealed by a hub cap 32.

The wheel bearing assembly with a brake rotor shown in FIG. 9 is a wheel bearing assembly for a non-driving wheel, and is an eighth embodiment of this invention. It has a wheel mounting flange 2 on the outer member 3, and has two raceways 3a, 3b directly formed on the inner surface of the outer member 3. Inside the outer member 3, an inner member 1 (comprising inner rings 15) having raceways 1a, 1b on the outer surface is provided. In this embodiment, a brake rotor 20 is fixed to the outer mounting surface 2a of the wheel mounting flange 2 of the outer member 3.

The wheel bearing assembly with a brake rotor shown in FIG. 10 is a ninth embodiment of this invention. This wheel bearing assembly has its outer member 3 formed by pressing a separate outer ring 17 having two rows of raceways 3a, 3b on the inner circumferential surface into an outer ring having a wheel mounting flange 2. An inner member 1 (inner rings 15) formed with raceways 1a, 1b on its outer surface is provided inside the outer member 3 through rolling elements 8. In this embodiment of FIG. 10, a brake rotor 20 is fixed to the outer mounting surface 2a of the wheel mounting flange 2 of the outer member 3 by bolts 18. In the eighth and ninth embodiments, the runout of the outer surface 21 of the brake rotor 20 is maintained within a standard value, which is, like the previous embodiments, preferably 50 $\mu$m or less, more preferably 30 $\mu$m or less.

In the wheel bearing assembly of each of the above embodiments, the seal is shown by numeral 19, and other like parts are denoted by like numerals.

Also, while in each of the above embodiments, the brake rotor 20 and the separate wheel mounting flange are fixed to each other by bolts, the brake rotor 20 and the wheel mounting flange 2 may be integrally formed.

Next, a way to maintain the runout of the outer surface 21 of the brake rotor 20 is described.

In a wheel bearing assembly with a brake rotor assembled, the surface runout of the outer surface 21 of the brake rotor 20 can be maintained within a standard value. This is possible by fixing the outer member 3 to a measuring table 5 as shown in FIG. 1, rotating the inner member 1 by a full turn with the outer member 3 fixed as a datum, and measuring the axial runout variation of the outer surface 21 of the brake rotor 20 fixed to the outer mounting surface 2a of the wheel mounting flange 2 by use of a dial gauge 6 pressed against the outer surface 21 of the brake rotor 20. The standard value of runout is preferably 50 µm or under. Since the runout variation of the outer surface 21 of the brake rotor 20 is greater at the outer side, the runout variation is controlled at a portion near the outer circumference.

As described above, in the wheel bearing assembly with a brake rotor according to this invention, when shipped from a wheel bearing manufacturer, the runout variation of the side of the brake rotor is maintained within a standard value beforehand with the fixed-side member as a reference. Therefore, it is reliable, and no troublesome brake rotor runout adjustment is necessary at the car assembling factory.

Also, only the surface of the brake rotor may be coated after the runout variation of the side face of the brake rotor has been maintained. There is no need to dismount the brake rotor from the wheel bearing assembly with the brake rotor for coating for rust prevention. Thus it is possible to suppress errors in runout variation caused by dismounting of the rotor.

What is claimed is:

1. An apparatus comprising:
   a wheel bearing assembly including:
      an outer member having two outer raceways on an inner circumferential surface thereof;
      an inner member having two inner raceways, each of said inner raceways being provided opposite a respective one of said two outer raceways on said outer member; and
      rolling elements arranged in two rows between said outer member and said inner member, wherein one of said outer member and said inner member is provided with a wheel mounting flange; and
   a brake rotor mounted to said wheel mounting flange, wherein a runout variation of a surface of said brake rotor is maintained at no greater than 50 µm when measured while rotating one of said outer member and said inner member while using the other of said outer member and said inner member as a datum.

2. The apparatus as claimed in claim 1, wherein said wheel mounting flange is integrally formed on said inner member.

3. The apparatus as claimed in claim 2, wherein a drive shaft is mounted in said inner member.

4. The apparatus as claimed in claim 3, wherein said inner member is formed integrally with an outer ring of a constant-velocity joint.

5. The apparatus as claimed in claim 1, wherein said wheel-mounting flange is integrally formed on said outer member.

6. The apparatus as claimed in claim 1, wherein said inner raceways are formed directly on an outer circumferential surface of said inner member.

7. The apparatus as claimed in claim 1, wherein at least one of said inner raceways of said inner member is formed on a secondary portion of said inner member not integrally connected to a main portion of said inner member.

8. The apparatus as claimed in claim 1, wherein said outer raceways are formed directly on the inner circumferential surface of said outer member.

9. The apparatus as claimed in claim 1, wherein said brake rotor is mounted to an inner surface of said wheel mounting flange.

10. The apparatus as claimed in claim 1, wherein said brake rotor is coated.

11. The apparatus of claim 1, further comprising a constant-velocity joint mounted in said inner member, wherein said inner member is provided with said wheel mounting flange, and said outer member is provided with a knuckle-mounting flange.

12. The apparatus as claimed in claim 11, wherein said inner raceways are formed directly on an outer circumferential surface of said inner member.

13. The apparatus as claimed in claim 11, wherein at least one of said inner raceways of said inner member is formed on a secondary portion of said inner member not integrally connected to a main portion of said inner member.

14. The apparatus as claimed in claim 11, wherein said outer raceways are formed directly on the inner circumferential surface of said outer member.

15. The apparatus as claimed in claim 11, wherein said brake rotor is mounted to an inner surface of said wheel mounting flange.

16. The apparatus as claimed in claim 11, wherein said brake rotor is coated.

* * * * *